US012689697B2

(12) United States Patent  
Araki et al.

(10) Patent No.: US 12,689,697 B2  
(45) Date of Patent: Jul. 21, 2026

(54) IMAGE FORMING APPARATUS PERFORMING HALFTONE PROCESSING SHIFTING SCAN LINE START POSITION IN MAIN-SCAN DIRECTION WHEN SCAN LINES ARE SHIFTED IN SUB-SCAN DIRECTION RELATIVE TO TARGET

(71) Applicant: CANON KABUSHIKI KAISHA, Tokyo (JP)

(72) Inventors: Go Araki, Shizuoka (JP); Mitsuhiro Obara, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 190 days.

(21) Appl. No.: 18/625,737

(22) Filed: Apr. 3, 2024

(65) Prior Publication Data

US 2024/0338542 A1 Oct. 10, 2024

(30) Foreign Application Priority Data

Apr. 4, 2023 (JP) ................................. 2023-060833

(51) Int. Cl.  
*H04N 1/047* (2006.01)  
*G06K 15/02* (2006.01)  
(Continued)

(52) U.S. Cl.  
CPC ......... *H04N 1/047* (2013.01); *G06K 15/1219* (2013.01); *G06K 15/1868* (2013.01);  
(Continued)

(58) Field of Classification Search  
CPC .... H04N 1/047; H04N 1/0443; H04N 1/0473;

H04N 1/053; H04N 1/29; H04N 1/295; H04N 1/405; H04N 1/409; H04N 2201/047; H04N 2201/04701; H04N 2201/0471; H04N 2201/04713; H04N 2201/04729;

(Continued)

(56) References Cited

U.S. PATENT DOCUMENTS

| 7,123,282 B2 * | 10/2006 | Fields ................ G03G 15/0115 |
| | | 347/240 |
| 8,149,463 B2 * | 4/2012 | Kawamura ............ H04N 1/405 |
| | | 358/1.9 |

(Continued)

FOREIGN PATENT DOCUMENTS

JP 2013-117699 A 6/2013

*Primary Examiner* — Scott A Rogers  
(74) *Attorney, Agent, or Firm* — Venable LLP

(57) ABSTRACT

An image forming apparatus includes: a unit configured to form an electrostatic latent image using a plurality of scan lines on a photosensitive body by, on a basis of an image signal, performing scanning of the photosensitive body in a main scan direction using one or more scanning beams repeatedly in a sub-scan direction orthogonal to the main scan direction; and a unit configured to store start position information indicating start positions in the main scan direction of the plurality of scan lines. In a case where scan positions in the sub-scan direction of the plurality of scan lines are linearly shifted relative to a target position with a period of N number of scan lines, the start position information indicates to linearly shift the start positions of N scan lines in the main scan direction along the sub-scan direction.

13 Claims, 14 Drawing Sheets

(51) Int. Cl.

| | |
|---|---|
| *G06K 15/12* | (2006.01) |
| *H04N 1/04* | (2006.01) |
| *H04N 1/053* | (2006.01) |
| *H04N 1/29* | (2006.01) |
| *H04N 1/405* | (2006.01) |
| *H04N 1/409* | (2006.01) |

(52) U.S. Cl.

CPC ....... *G06K 15/1881* (2013.01); *H04N 1/0443* (2013.01); *H04N 1/0473* (2013.01); *H04N 1/053* (2013.01); *H04N 1/29* (2013.01); *H04N 1/295* (2013.01); *H04N 1/405* (2013.01); *H04N 1/409* (2013.01); *H04N 2201/047* (2013.01); *H04N 2201/04701* (2013.01); *H04N 2201/0471* (2013.01); *H04N 2201/04713* (2013.01); *H04N 2201/04729* (2013.01); *H04N 2201/04734* (2013.01); *H04N 2201/04744* (2013.01); *H04N 2201/04748* (2013.01); *H04N 2201/04753* (2013.01); *H04N 2201/04758* (2013.01); *H04N 2201/04767* (2013.01); *H04N 2201/04786* (2013.01); *H04N 2201/04791* (2013.01)

(58) Field of Classification Search

CPC .......... H04N 2201/04734; H04N 2201/04744; H04N 2201/04748; H04N 2201/04753; H04N 2201/04758; H04N 2201/04767; H04N 2201/04786; H04N 2201/04791; G06K 15/1219; G06K 15/1868; G06K 15/1881

See application file for complete search history.

(56) References Cited

U.S. PATENT DOCUMENTS

| | | | | |
|---|---|---|---|---|
| 8,339,656 | B2 * | 12/2012 | Komiya | ................... H04N 1/58 |
| | | | | 358/1.18 |
| 8,462,189 | B2 * | 6/2013 | Kato | .................... H04N 1/1135 |
| | | | | 347/261 |
| 9,158,223 | B2 * | 10/2015 | Komiya | ............... G03G 15/043 |
| 11,973,914 | B2 * | 4/2024 | Araki | .................. G03G 15/043 |
| 2007/0115339 | A1 * | 5/2007 | Matsuzaki | ......... G03G 15/0194 |
| | | | | 347/118 |
| 2013/0141510 | A1 | 6/2013 | Araki | |

* cited by examiner

F I G.  1
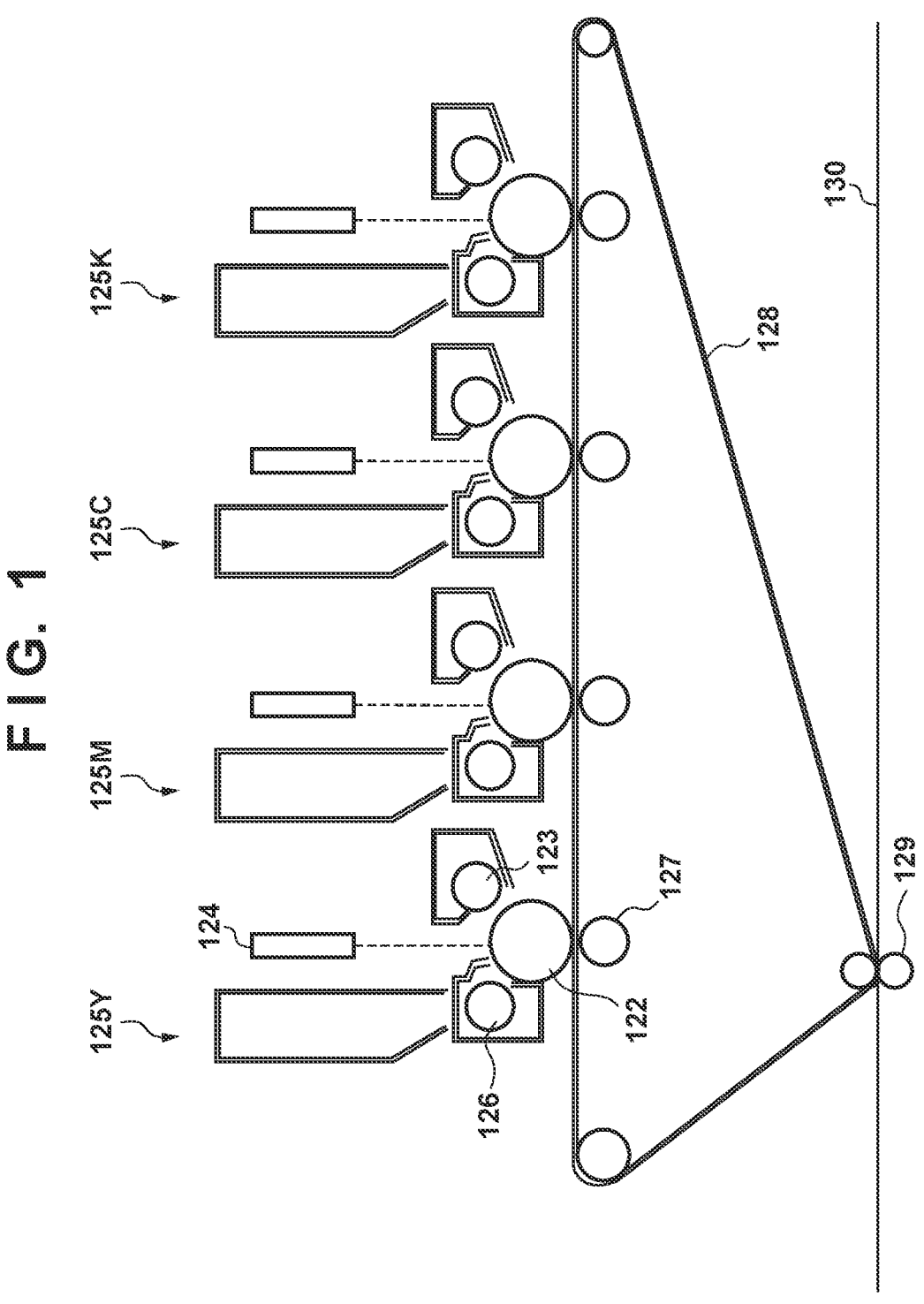

F I G. 5
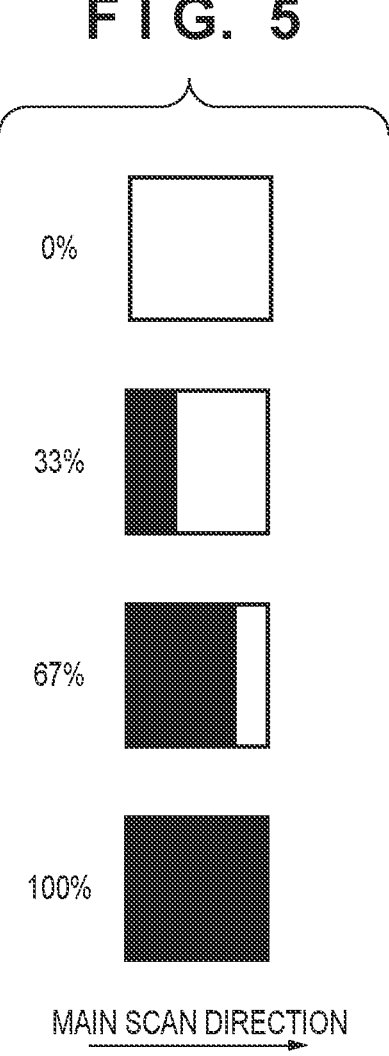
0%
33%
67%
100%
MAIN SCAN DIRECTION

F I G. 6A
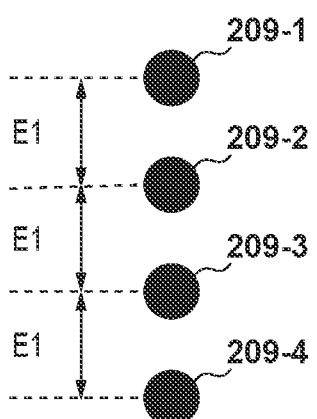
209-1
E1
209-2
E1
209-3
E1
209-4
F I G. 6B
81-1
E2
81-2
E2
81-3
E2
81-4
MAIN SCAN
DIRECTION
SUB-SCAN DIRECTION

F I G.  7A

F I G.  7B

F I G. 8B
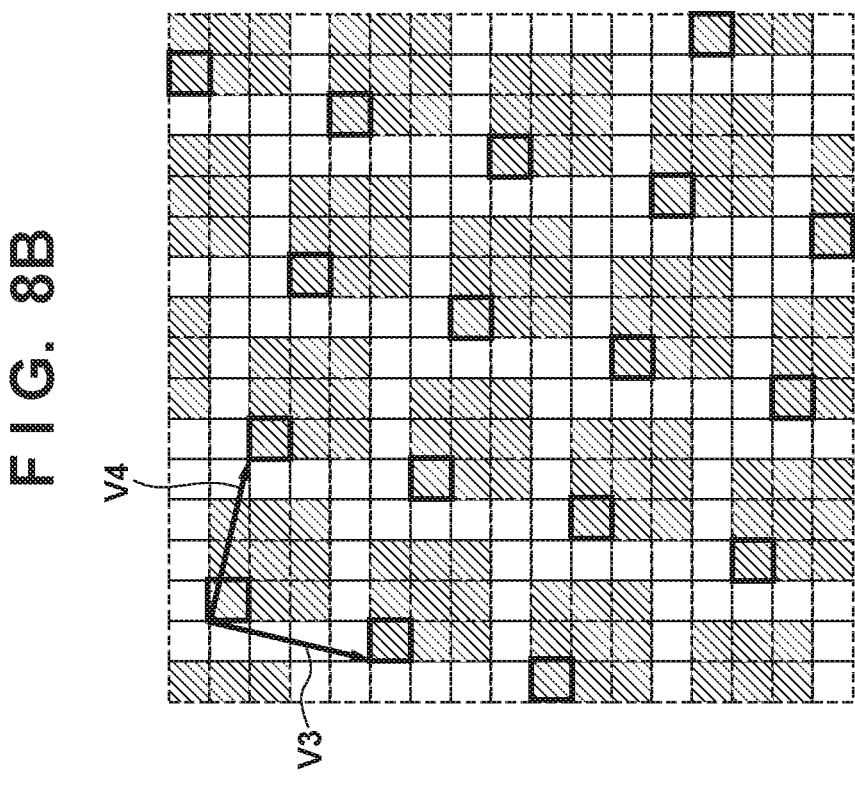
F I G. 8A
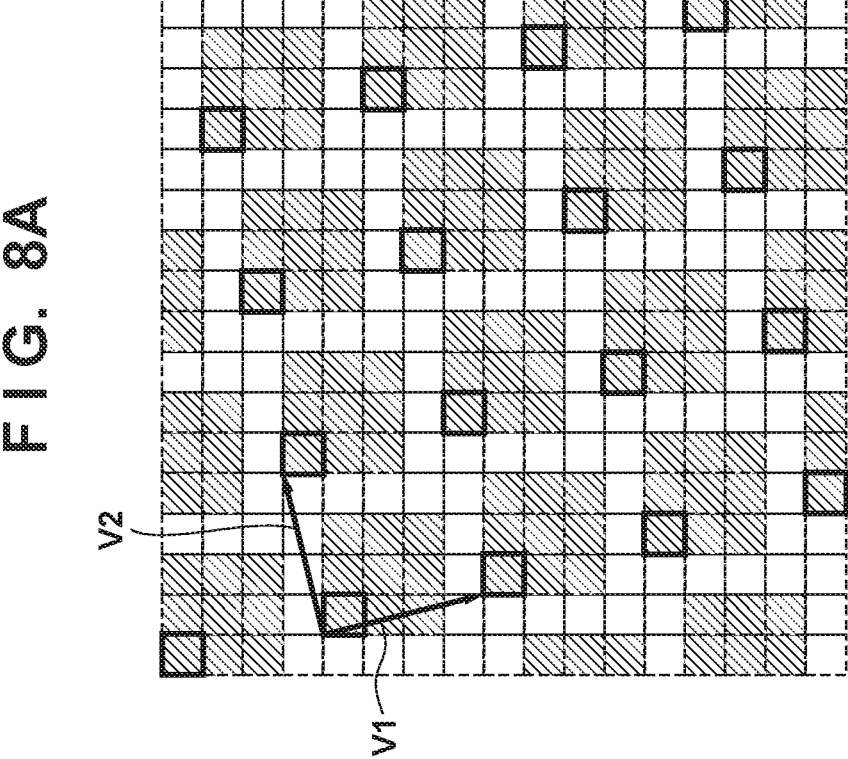

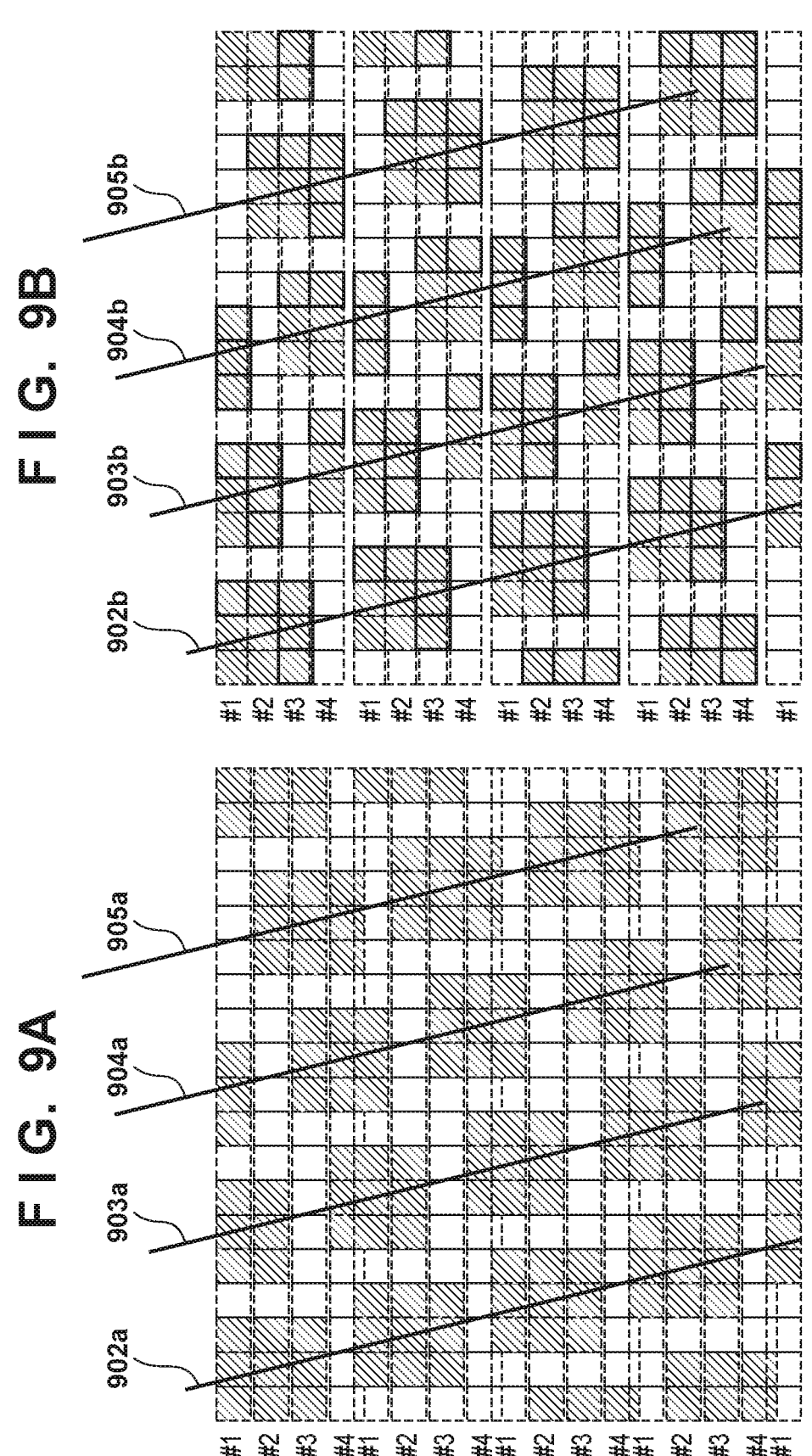

F I G. 10A
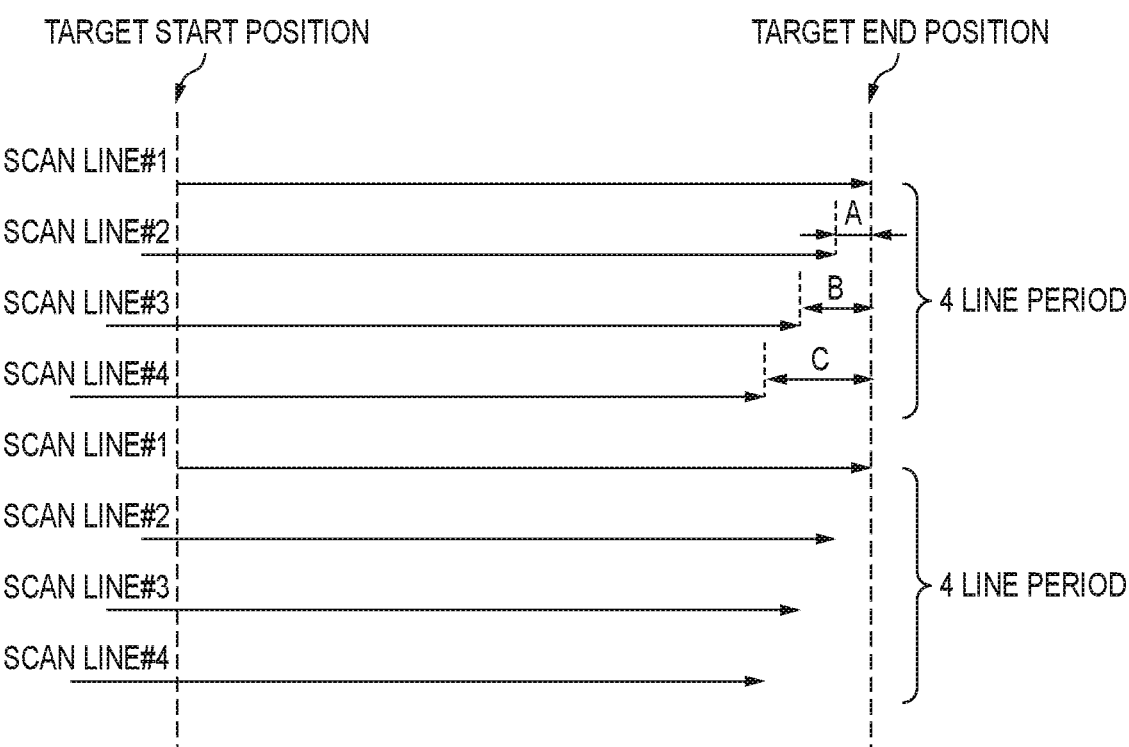
F I G. 10B
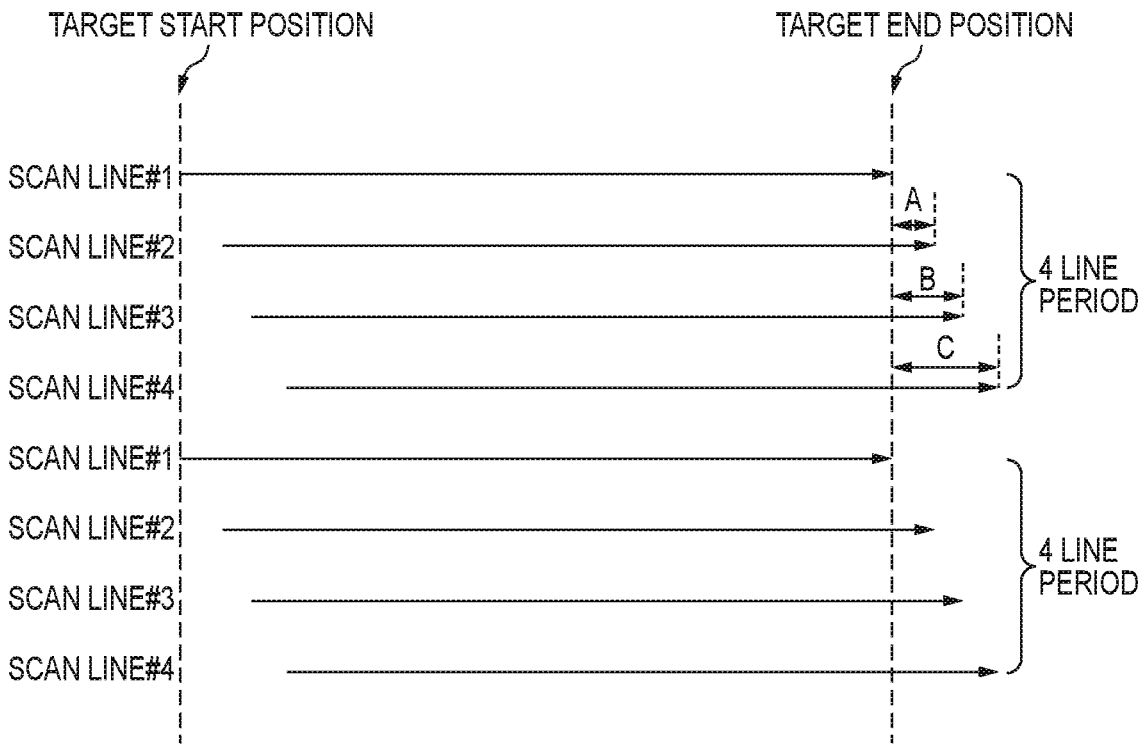

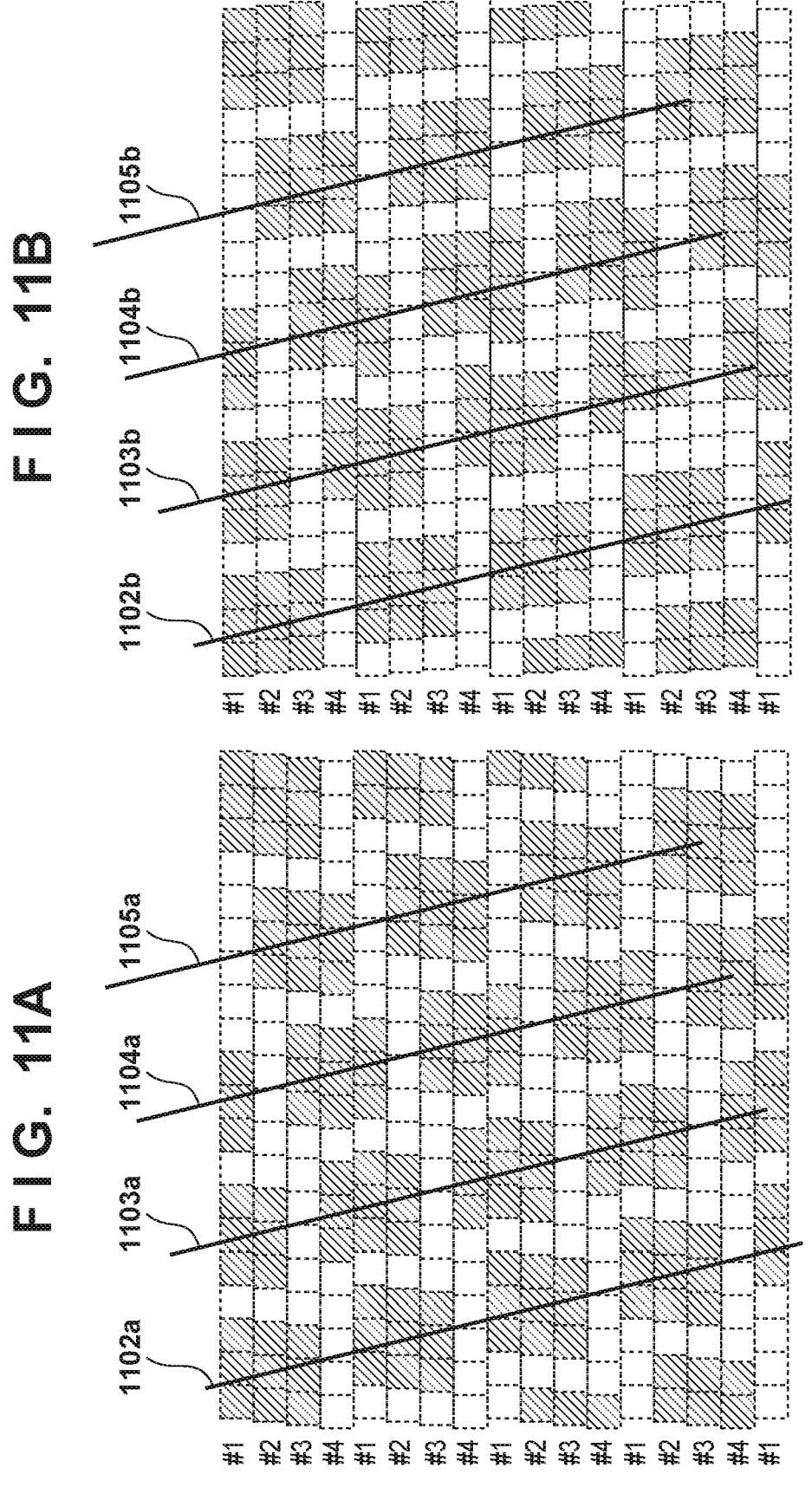
F I G. 11A
F I G. 11B

REGION 1D

REGION 2D / REGION 3D

REGION 1C

REGION 2C / REGION 3C

REGION 1B

REGION 2B / REGION 3B

REGION 1A

REGION 2A / REGION 3A

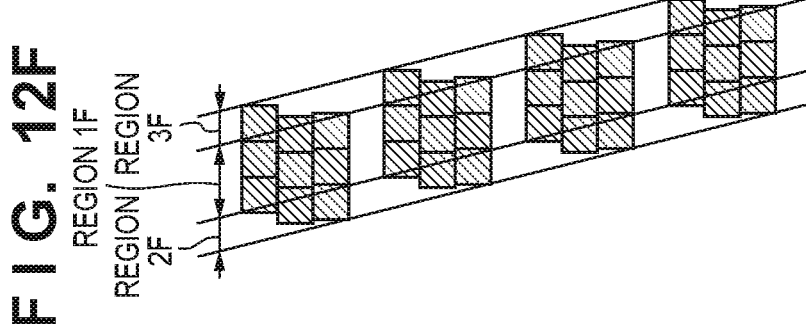
FIG. 12E
REGION 1E
REGION
2E
REGION
3E
FIG. 12F
REGION 1F
REGION
2F
REGION
3F
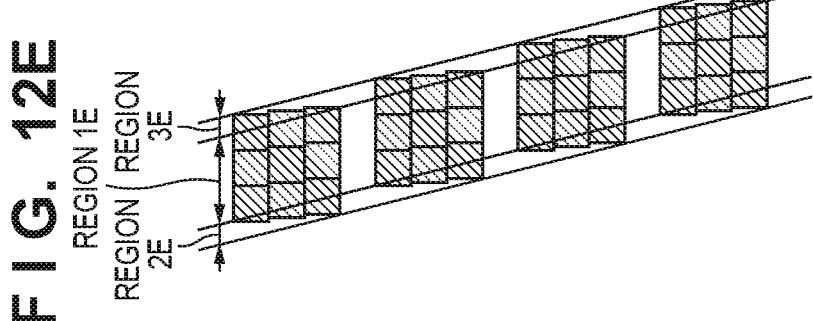
FIG. 12G
REGION 1G
REGION
2G
REGION
3G

F I G. 13

| | HALFTONE PROCESSING#1 | | HALFTONE PROCESSING#2 | |
|---|---|---|---|---|
| DISPLACEMENT DIRECTION OF SCAN LINE (SUB-SCAN DIRECTION) | POSITIVE SIDE | NEGATIVE SIDE | POSITIVE SIDE | NEGATIVE SIDE |
| SHIFT DIRECTION OF SCAN LINE REDUCING MOIRÉ (MAIN SCAN DIRECTION) | NEGATIVE SIDE | POSITIVE SIDE | POSITIVE SIDE | NEGATIVE SIDE |
| DIRECTION OF SHIFT PROCESSING IN WHICH MOIRÉ IS LESS VISUALLY PERCEIVABLE (MAIN SCAN DIRECTION) | NEGATIVE SIDE | | POSITIVE SIDE | |

IMAGE FORMING APPARATUS PERFORMING HALFTONE PROCESSING SHIFTING SCAN LINE START POSITION IN MAIN-SCAN DIRECTION WHEN SCAN LINES ARE SHIFTED IN SUB-SCAN DIRECTION RELATIVE TO TARGET

BACKGROUND OF THE INVENTION

Field of the Invention

The present invention relates to an image forming apparatus such as a laser beam printer, a digital copy machine, a digital fax machine, and the like.

Description of the Related Art

An electro-photographic image forming apparatus repeatedly scans a rotationally-driven photosensitive body with a scanning beam based on image data to form an electrostatic latent image on a photosensitive body and form an image by developing the electrostatic latent image with a toner. The path on the photosensitive body of the scanning beam is referred to as a scan line, and the movement direction of the scanning beam is referred to as the main scan direction. Also, the direction orthogonal to the main scan direction in which the scan line is formed in order is referred to as the sub-scan direction. Note that the main scan direction is substantially parallel with the rotation axis of the photosensitive body. Also, on the photosensitive body, the opposite direction to the rotation direction of the photosensitive body corresponds to the sub-scan direction.

In the photosensitive body, a rotating polygonal member is used for moving the scanning beam in the main scan direction. When the length of each scan line and its position in the main scan direction are periodically shifted along sub-scan direction, moire may appear in the image due to interference with the period of the halftone processing. Also, even when the position of each scan line in the sub-scan direction is periodically shifted along the sub-scan direction, moire may appear in the image due to interference with the period of the halftone processing. Note the periodic shift of the scan lines may be caused by a manufacturing error in each reflective surface of the rotating polygonal member, for example. Also, in the configuration for scanning a photosensitive body using a plurality of scanning beams emitted by a plurality of light sources, a periodic shift of the scan lines may be caused by an arrangement error of the plurality of light sources, for example.

US-2013-0141510 discloses a configuration for aligning the lengths of the scan lines from the scanning beams reflected at the reflective surfaces of a rotating polygonal member. According to US-2013-0141510, an error in the length of a scan line is measured per reflective surface, and when forming an image, the lengths of the scan lines are aligned by inserting or removing a pixel piece obtained by dividing one pixel.

For example, with a configuration in which a photosensitive body is scanned using a plurality of scanning beams emitted by a plurality of light sources, there may be periodic and linear displacement in the sub-scan direction of the scan position in the sub-scan direction of the scan lines. In the configuration of US-2013-0141510, the moire caused by a periodic shift in the lengths in the main scan direction of the scan lines can be reduced, but moire caused by a periodic shift in the sub-scan direction of the scan position of the scan lines cannot be reduced.

SUMMARY OF THE INVENTION

According to an aspect of the present disclosure, an image forming apparatus includes: a photosensitive body; a scanning unit configured to form an electrostatic latent image using a plurality of scan lines on the photosensitive body by, on a basis of an image signal, performing scanning of the photosensitive body in a main scan direction using one or more scanning beams repeatedly in a sub-scan direction orthogonal to the main scan direction; a generating unit configured to perform halftone processing on image data and generate the image signal; and a storing unit configured to store start position information indicating start positions in the main scan direction of the plurality of scan lines, wherein, in a case where scan positions in the sub-scan direction of the plurality of scan lines are linearly shifted relative to a target position with a period of N number (N being an integer of 2 or more) of scan lines, the start position information indicates to linearly shift the start positions of N scan lines in the main scan direction along the sub-scan direction.

Further features of the present invention will become apparent from the following description of exemplary embodiments with reference to the attached drawings.

BRIEF DESCRIPTION OF THE DRAWINGS

FIG. 1 is a schematic configuration diagram of an image forming apparatus according to some embodiments.

FIG. 5 is an explanatory diagram of a pixel piece.

FIG. 6A is an explanatory diagram of the arrangement of a plurality of light sources.

FIG. 6B is an explanatory diagram of the positional relationship at a photosensitive body of scanning beams from a plurality of light sources.

FIGS. 7A and 7B are diagrams illustrating examples of a linear and periodic shift in scan positions in the sub-scan direction of scan lines from a plurality of light sources.

FIGS. 8A and 8B are diagrams illustrating images formed by halftone processing according to an embodiment.

FIGS. 9A and 9B are explanatory diagrams of moire being caused by a periodic shift in scan positions in the sub-scan direction of scan lines.

FIGS. 10A and 10B are diagrams illustrating shift processing of scan lines for reducing moire caused by a periodic shift in scan positions in the sub-scan direction of scan lines.

FIGS. 11A and 11B are diagrams illustrating images to which the shift processing of FIGS. 10A and 10B have been applied.

FIGS. 12A to 12G are explanatory diagrams of reducing moire using the shift processing of FIGS. 10A and 10B.

FIG. 13 is a diagram illustrating the relationship between halftone processing and a shift direction in shift processing.

DESCRIPTION OF THE EMBODIMENTS

Figure 2:
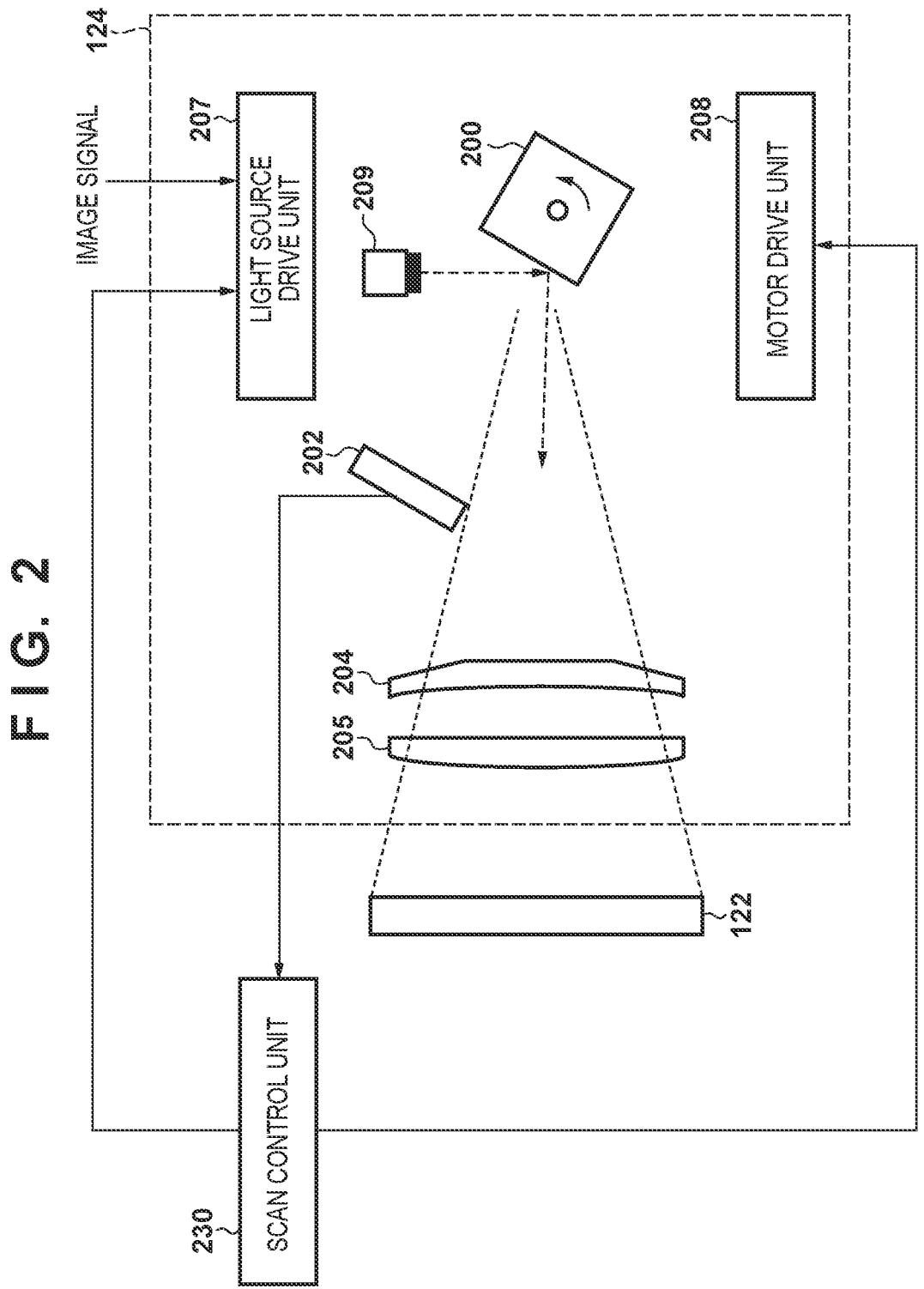
FIG. 2 is a configuration diagram of a scanning unit according to some embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a schematic configuration diagram of an image forming apparatus of the present embodiment. Note that in the following diagrams, to facilitate description, components that are not necessary for understanding the embodiments are omitted. Image forming units 125Y, 125M, 125C, and 125K respectively form a yellow, magenta, cyan, and black toner image on an intermediate transfer body 128. Note that the image forming units 125Y, 125M, 125C, and 125K form toner images on top of one another on the intermediate transfer body 128 to reproduce colors that are different from yellow, magenta, cyan, and black. The image forming units 125Y, 125M, 125C, and 125K all have a similar configuration and each include a photosensitive body 122, a charging roller 123, a scanning unit 124, a developing roller 126, and a primary transfer roller 127. Hereinafter, the image forming units 125Y, 125M, 125C, and 125K may also be referred to by the generic term "image forming unit 125".

The photosensitive body 122 is rotationally driven in the anticlockwise direction of the drawing when forming an image. The charging roller 123 charges the surface of the rotating photosensitive body 122 with a uniform potential. The scanning unit 124 repeatedly scans the rotating photosensitive body 122 in a main scan direction with scanning beams based on image data to form an electrostatic latent image on the photosensitive body 122. The main scan direction is parallel with the rotation axis of the photosensitive body 122 and is the direction in which the scanning beams moves. The direction orthogonal to the main scan direction in which the scan lines are formed in order is referred to as a sub-scan direction. On the photosensitive body 122, the opposite direction to the rotation direction of the photosensitive body 122 corresponds to the sub-scan direction. The developing roller 126 develops the electrostatic latent image of the photosensitive body 122 using toner to form a toner image on the photosensitive body 122. The primary transfer roller 127 transfers the toner image of the photosensitive body 122 to the intermediate transfer body 128. The intermediate transfer body 128 is rotationally driven in the clockwise direction of the drawing when forming an image. Thus, the toner image of the intermediate transfer body 128 is conveyed to an opposite position of a secondary transfer roller 129. The secondary transfer roller 129 transfers the toner image of the intermediate transfer body 128 to a sheet conveyed along a conveying path 130. Thereafter, the sheet is conveyed to a fixing unit (not illustrated) where the toner image is fixed to the sheet. After the toner image is fixed, the sheet is discharged to the outside of the image forming apparatus.

FIG. 2 is a configuration diagram of the scanning unit 124. A light source drive unit 207, under the control of a scan control unit 230, performs light emission control of a light source 209 on the basis of an image signal. A motor drive unit 208, under the control of the scan control unit 230, performs control of the rotational speed and the rotational phase of a rotating polygonal member 200. The scanning beam emitted by the light source 209 is reflected and deflected by each reflective surface of the rotating polygonal member 200, which includes a plurality of reflective surfaces, to scan the photosensitive body 122. Note that fθ lenses 204 and 205 are provided to make the scanning speed at the photosensitive body 122 of the scanning beam deflected by the rotating polygonal member 200 a certain speed. An optical sensor 202 detects the scanning beam reflected in a predetermined direction by each reflective surface of the rotating polygonal member 200. The timing at which the optical sensor 202 detects the scanning beams is output to the scan control unit 230 as a synchronizing signal.

The scan control unit 230 determines the rotational speed and the rotational phase of the rotating polygonal member 200 on the basis of the detection period of the synchronizing signal from the optical sensor 202 and controls the rotation of the rotating polygonal member 200 such that the rotational speed and the rotational phase become the target values.

In the configuration of FIG. 2, the rotating polygonal member 200 includes four reflective surfaces. However, this is an example, and the number of reflective surfaces can be one or more. Also, in the configuration of FIG. 2, the photosensitive body 122 is scanned with one scanning beam emitted by one light source 209. However, in another configuration, the photosensitive body 122 may be scanned by a plurality of scanning beams emitted by a plurality of the light sources 209. Note that a plurality of scanning beams emit light at different positions on the photosensitive body 122 in the sub-scan direction. In the case of using a plurality of scanning beams, the synchronizing signal may be generated on the basis of one scanning beam.

Figure 3:
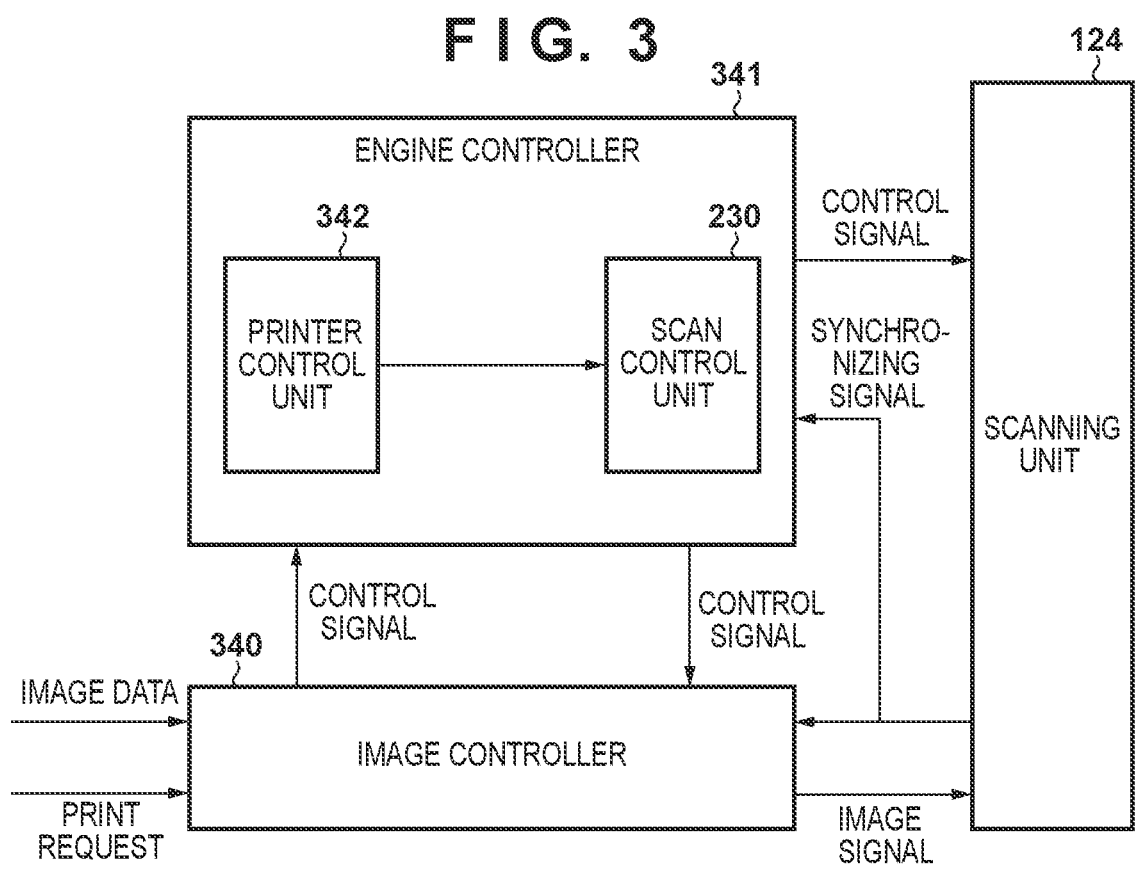
FIG. 3 is a control configuration diagram of an image forming apparatus according to some embodiments.

FIG. 3 illustrates the overall control configuration of the image forming apparatus. When image data from an external apparatus (not illustrated) and a print request based on the image data are received by an image controller 340, for example, the image controller 340 generates an image signal of each color on the basis of the image data and transmits the corresponding color image signals to the scanning unit 124. Note that the timing of when the image signals are output to the scanning unit 124 is determined on the basis of the synchronizing signal from the scanning unit 124. A printer control unit 342 of an engine controller 341, under the control of the image controller 340, performs control of each member illustrated in FIG. 1. The control performed by the printer control unit 342 includes control of the scanning unit 124 via the scan control unit 230.

Figure 4:
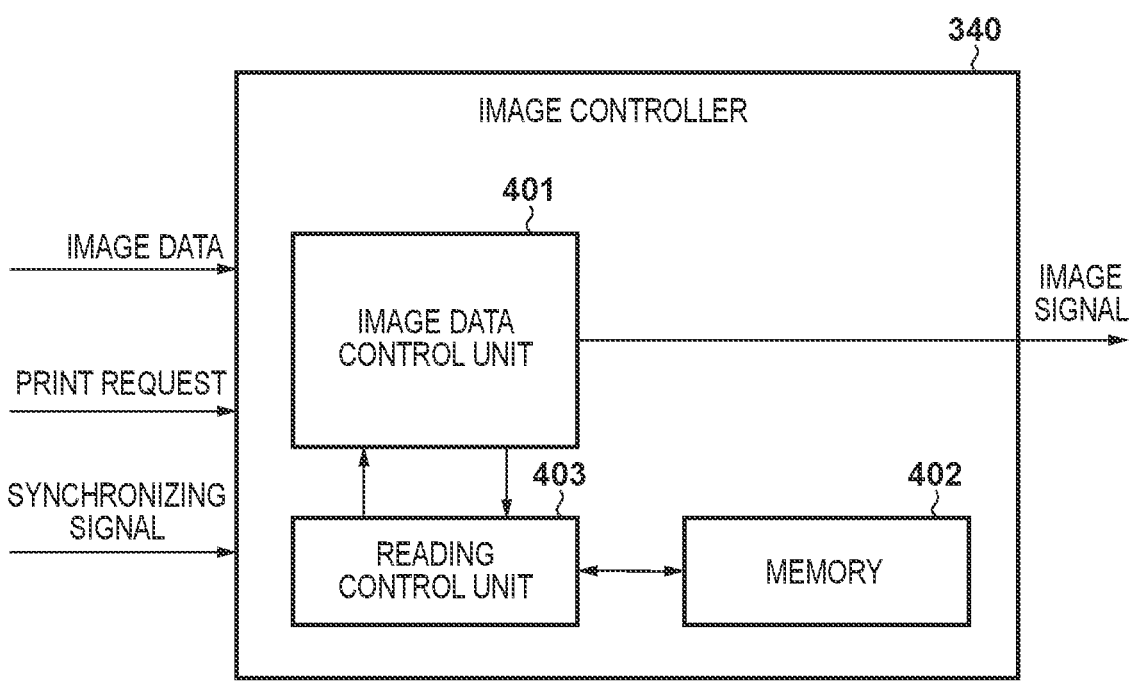
FIG. 4 is a block diagram of an image controller according to some embodiments.

FIG. 4 is a configuration diagram of the image controller 340. A memory 402 stores correction information corresponding to the scanning unit 124 of each image forming unit 125. The correction information including "length adjustment information" for aligning the "length" of each scan line of the corresponding scanning unit 124. Also, the correction information includes "start position information" for adjusting the "scanning start position" of each scan line of the corresponding scanning unit 124. The correction information will be described below. Note that the processing for the scanning unit 124 included in each one of the image forming units 125Y, 125M, 125C, and 125K is similar for each one. Thus, the processing for one scanning unit 124 will be described below. A reading control unit 403 reads the correction information held by the memory 402. An image data control unit 401 performs various types of processing on the image data and generates a pulse width modulation (PWM) signal. Note that the various types of processing performed on the image data include halftone processing. The image data control unit 401 corrects the PWM signal to align the lengths of each scan line on the basis of the length adjustment information included in the correction information. Then, after the image data control unit 401 adjusts the scanning start timing of each scan line on the photosensitive body 122 on the basis of the start position information included in the correction information, the image data control unit 401 outputs the corrected PWM signal to the scanning unit 124 as an image signal. The scanning unit 124 performs control of the light emission of the light source 209 on the basis of the PWM signal. In the present embodiment, the light source 209 emits light in a period in which the PWM signal is a high level, and the light source 209 does not emit light in a period in which the PWM signal is a low level. Note that in the case of using a plurality of light sources, an image signal may be generated for each light source and output to the scanning unit 124.

FIG. 5 illustrates an example of exposure of one pixel by a PWM signal. For example, in case of 600 dpi, a length (width) of one pixel in the main scan direction is about 0.042 mm. In FIG. 5, one pixel is divided into three pixel pieces, and the pixel is exposed by each pixel piece. A single pulse of the PWM signal corresponds to a single image piece and, in the present example, the corresponding pixel piece is exposed when the pulse is at a high level, and the corresponding pixel piece is unexposed when the pulse is at a low level. In FIG. 5, a black pixel piece indicates an exposed pixel piece, and a white pixel piece indicates an unexposed pixel piece. The number at the side of each pixel indicates the percentage of the exposed area relative to the area of one pixel, which corresponds to the density. Note that the number of pixel pieces forming one pixel is not limited to 3, and any number of 2 or more can be used. In the present embodiment, a pixel piece is inserted or removed on the basis of the "length adjustment information" included in the correction information in order to align the length of each scan line.

FIG. 6A illustrates an arrangement of four light sources 209-1 to 209-4 when the four light sources 209-1 to 209-4 are used. As illustrated in FIG. 6A, the four light sources 209-1 to 209-4 are arranged in a linear pattern, and the arrangement interval is E1. For example, E1 is about 0.03 mm. The interval between the scanning light emitted by the four light sources 209-1 to 209-4 arranged as in FIG. 6A expands to about 0.175 mm on the photosensitive body 122 by the action of the fθ lenses 204 and 205. When an image is formed with 600 dpi, the interval between the scan lines in the sub-scan direction is required be about 0.042 mm.

Thus, as illustrated in FIG. 6B, the emission direction of the scanning light from the light sources 209-1 to 209-4 is adjusted so that an interval E2 in the sub-scan direction at the photosensitive body 122 of scanning beams 81-1 to 81-4 emitted by the four light sources 209-1 to 209-4 becomes about 0.042 mm. In other words, a line joining the scanning beams 81-1 to 81-4 emitted by the four light sources 209-1 to 209-4 is rotated to run in a different direction from the sub-scan direction and the main scan direction on the photosensitive body 122.

Adjustment is performed at the time of manufacture to make the distance between the scanning beam 81-1 and the scanning beam 81-4 in the sub-scan direction equal to 3*E2. Thus, the positions in the main scan direction of the scanning beams 81-1 to 81-4 irradiating the photosensitive body 122 will be different at a certain moment. Hereinafter, the reference value of the interval E2 in the sub-scan direction of the plurality of scanning beams at the photosensitive body 122 will be referred to as reference interval E2.

Figures 7A, 7B:
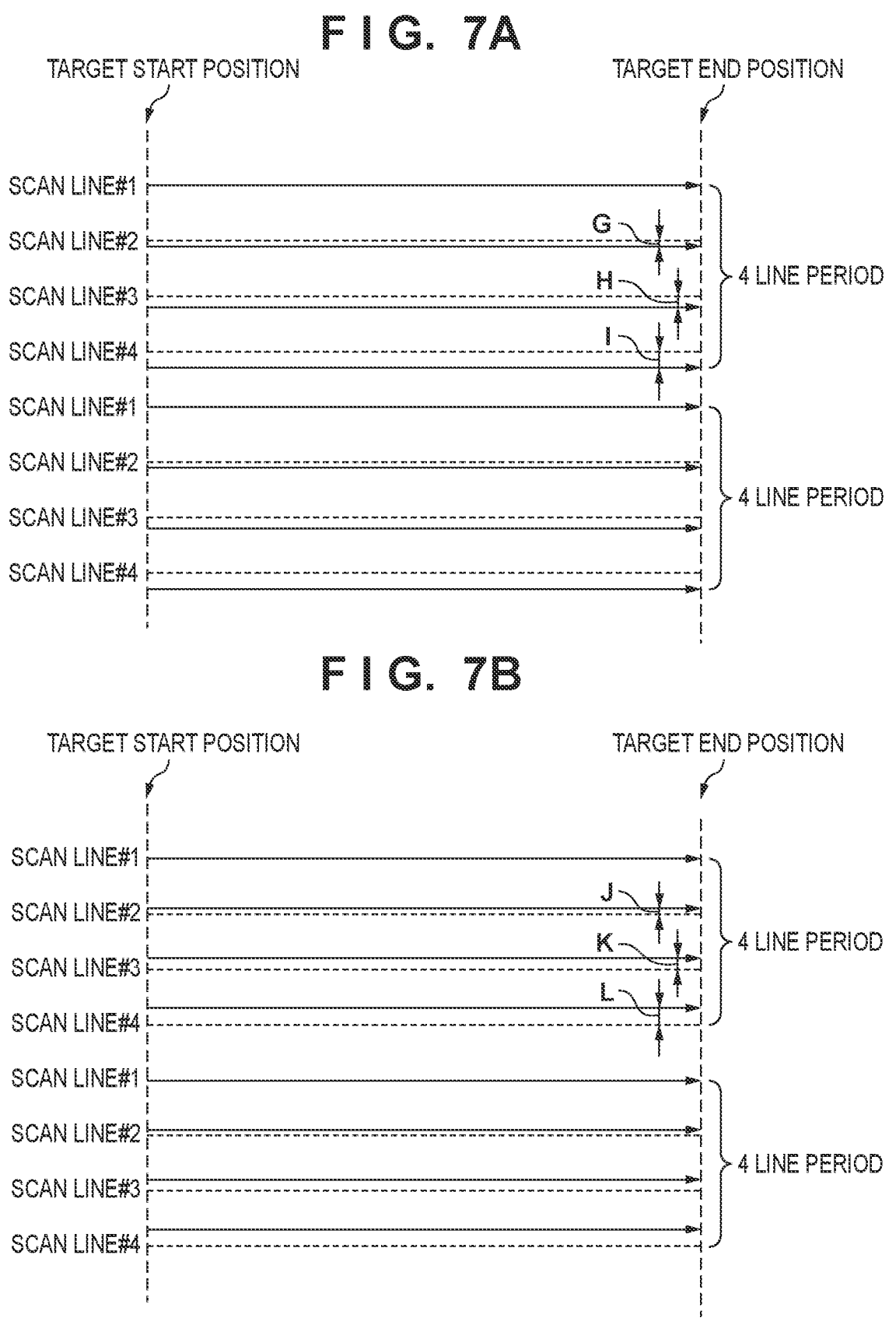

FIGS. 7A and 7B illustrate states in which the positions of scan lines have deviated from a target position due to a manufacturing error or the like. Note that in FIGS. 7A and 7B, the scan lines from the four scanning beams 81-1 to 81-4 are denoted as scan lines #1 to #4. The target start position in FIGS. 7A and 7B is a reference position in the main scan direction of the photosensitive body 122 where scanning by the scanning beams 81-1 to 81-4 starts. Similarly, the target end position is a reference position in the main scan direction of the photosensitive body 122 where scanning by the scanning beams 81-1 to 81-4 ends.

FIG. 7A illustrates a state in which the scan positions of the scan lines #2 to #4 in the sub-scan direction have shifted to the positive side in the sub-scan direction of the target position indicated by a broken line. Note that the shift amounts of the scan lines #2 to #4 are G, H, and I, respectively. The shift as illustrated in FIG. 7A may be caused by the interval in the sub-scan direction of the scanning beams 81-1 to 81-4 illustrated in FIG. 6B becoming greater than the reference interval E2. In this case, the absolute values of the shift amounts satisfy the relationship G<H<I. Specifically, the absolute value of G is about ⅓ the absolute value of I, and the absolute value of H is about ⅔ the absolute value of I. In FIG. 7A, the shift in the sub-scan direction in the scan positions of the scan lines is caused periodically and linearly on the positive side of the sub-scan direction along the sub-scan direction.

FIG. 7B illustrates a state in which the scan lines #2 to #4 have shifted to the negative side in the sub-scan direction, that is, the opposite direction to the sub-scan direction relative to the target position indicated by a broken line. Note that the shift amounts of the scan lines #2 to #4 are J, K, and L, respectively. The shift as illustrated in FIG. 7B may be caused by the interval in the sub-scan direction of the scanning beams 81-1 to 81-4 illustrated in FIG. 6B becoming less than the reference interval E2. As described with reference to FIG. 7A, the absolute values of the shift amount satisfy the relationship J<K<L. Specifically, the absolute value of J is about ⅓ the absolute value of L, and the absolute value of K is about ⅔ the absolute value of L. In FIG. 7B, the shift in the sub-scan direction in the scan positions of the scan lines is caused periodically and linearly on the negative side of the sub-scan direction along the sub-scan direction.

In FIGS. 7A and 7B, the deviation in the scan positions is caused in a period formed by the four scan lines (4 lines) corresponding to the four scanning beams. Note that in a case where the deviation in the scan lines per reflective surface is caused by a manufacturing error of the reflective surfaces of the rotating polygonal member 200 or the like, the deviation in the scan lines may be caused in a period formed by the number of scanning beams×the number of reflective surfaces. In a case where the scan positions of the scan lines in the sub-scan direction periodically deviate, periodic fluctuation in halftone dots in the halftone processing may occur. When fluctuation in halftone dots occurs, the halftone dots may be dense or sparse, causing moire.

The principle behind moire being caused by deviation in the scan positions of the scan lines in the sub-scan direction will be described below. FIGS. 8A and 8B illustrate examples of images subjected to halftone processing with a 146-line dither matrix. In FIGS. 8A and 8B, as well as in similar diagrams below, the direction from left side to right side in the diagram corresponds to the main scan direction, and the direction from up to down in the diagram corresponds to the sub-scan direction. Thus, the direction of movement of the scanning beams is from left to right in the diagram, and scanning is performed from up to down. Also, a shift to the main scan direction and the sub-scan direction is referred to as a shift to the "positive side", and a shift to the direction opposite the main scan direction and the sub-scan direction is referred to as a shift to the "negative side".

FIGS. 8A and 8B are magnified views of an image portion with a 52% density of the maximum density (100%). As the density is 52%, toner is adhered to $9/17$ of the area (shaded region in the diagram). Hereinafter, a region where the toner gathers and adheres via exposure of consecutive pixel pieces is referred to as a "dot region". A dot region may be also referred to as a halftone dot. In halftone processing, a plurality of starting points (for example, the dark bordered pixels in the diagram) are arranged, and the dot regions (halftone dots) increase in size from the starting points as the image density increases. The starting points are periodically arranged in a two-dimensional flat plane. In other words, the starting points are periodically arranged in the main scan direction and the sub-scan direction.

Accordingly, for halftone processing, two vectors joining adjacent starting points are defined. Specifically, a certain starting point is set as a reference starting point, and a different starting point adjacent to the reference starting point is set as an adjacent starting point. The two vectors are a first vector joining the reference starting point and a first adjacent starting point from among the plurality of adjacent starting points and a second vector joining the reference starting point and a second adjacent starting point from among the plurality of adjacent starting points which is different from the first adjacent starting point. Note that the first adjacent starting point and the second adjacent starting point are adjacent starting points with the shortest distance from the reference starting point from among the adjacent starting points. Also, the angle of the first vector and the second vector is not 0 degrees nor 180 degrees.

For example, in the halftone processing of FIG. 8A, a vector V1 (first vector) and a vector V2 (second vector) may be defined. In a similar manner, in the halftone processing of FIG. 8B, a vector V3 (first vector) and a vector V4 (second vector) may be defined. Note that in the present example, the first vector is a vector running toward the positive side of the sub-scan direction, and the second vector is a vector running toward the positive side of the main scan direction. Specifically, of the two vectors, the vector with the smaller angle with the sub-scan direction is the first vector. The vectors V1, V2, V3 and V4 are respectively represented by coordinates in units of the number of pixels in the main scan direction and sub-scan direction as (1, 4), (4, −1), (−1, 4) and (4, 1).

In the halftone processing of FIG. 8A, the first vector is the vector running toward the positive side of the sub-scan direction and toward the positive side of the main scan direction. In the halftone processing of FIG. 8B, the first vector is the vector running toward the positive side of the sub-scan direction and toward the negative side of the main scan direction. Hereinafter, the halftone processing illustrated in FIG. 8A with the first vector running toward the positive side of the main scan direction is referred to as "halftone processing #1". The halftone processing illustrated in FIG. 8B with the first vector running toward the negative side of the main scan direction is referred to as "halftone processing #2".

FIG. 9A illustrates a case in which a shift in the scan lines illustrated in FIG. 7A has occurred when forming an image using the halftone processing #1 illustrated in FIG. 8A. FIG. 9B illustrates a case in which a shift in the scan lines illustrated in FIG. 7B has occurred when forming an image using the halftone processing #1 illustrated in FIG. 8A. Note that #1 to #4 in FIGS. 9A and 9B indicate the number of the scan line performing scanning. Hereinafter, the terms "position", "shift", "length", "distance", "positive side", "negative side", "upstream side", "downstream side", and the like refer to the position, shift, length, distance, positive side, negative side, upstream side, downstream side, and the like relating to the sub-scan direction unless mentioned otherwise.

In FIG. 9A, a line 902a joins the centroids of first dot regions formed by the scan lines #1, #2, and #3. A line 903a joins the centroids of second dot regions formed by the scan lines #4, #1, and #2. A line 904a joins the centroids of third dot regions formed by the scan lines #3, #4, and #1. A line 905a joins the centroids of fourth dot regions formed by the scan lines #2, #3, and #4. When there is no shift in the scan lines, the direction of the line 902a to line 905a corresponds to the direction of the vector V1.

In FIG. 9A, the length of the first dot regions formed by the scan lines #1, #2, and #3 is longer than the ideal length by $H=2I/3$, as seen from the relationship of FIG. 7A. In a similar manner, the length of the fourth dot regions formed by the scan lines #2, #3, and #4 is longer than the ideal length by $(I-G)=2I/3$. The length of the second dot regions formed by the scan lines #4, #1, and #2 is shorter than the ideal length by $(I-G)=2I/3$. In a similar manner, the length of the third dot regions formed by the scan lines #3, #4, and #1 is shorter than the ideal length by $H=2I/3$.

Thus, in FIG. 9A, the area of the first dot regions and the fourth dot regions is larger than the ideal area, namely, the area when there is no shift in the scan positions as illustrated in FIG. 7A, and the area of the second dot regions and the third dot regions is smaller than the ideal area. Accordingly, the intensity of the regions corresponding to the line 902a joining the first dot regions and the line 905a joining the fourth dot regions is stronger than the ideal intensity. On the other hand, the intensity of the regions corresponding to the line 903a joining the second dot regions and the line 904a joining the third dot regions is weaker than the ideal intensity. By having strong/weak repeating regions corresponding to the line 902a to the line 905a, high/low density repeats in the direction orthogonal to the vector V1 in FIG. 9A. Thus, as in FIG. 9A, the repeating high/low density is visually perceived as moire. Note that hereinafter, the moire direction is defined as the direction in which the high/low density repeats. Thus, as in FIG. 9A, moire in the direction orthogonal to the vector V1 is visually perceived.

As in FIG. 9A, in FIG. 9B, lines 902b to 905b join the centroids of the first dot regions to the fourth dot regions. When there is no shift in the scan lines, the direction of the line 902b to line 905b corresponds to the direction of the vector V1. FIG. 9B is different from FIG. 9A in that the scan lines are shifted in the negative side of the sub-scan direction. Thus, the scaling of the area of each dot region is the opposite of that described in FIG. 9A. In other words, in FIG. 9B, the area of the first dot regions and the fourth dot regions is smaller than the ideal area, and the area of the second dot regions and the third dot regions is larger than the ideal area. Thus, the intensity of the regions corresponding to the line 902b and the line 905b is weaker than the ideal intensity, and the intensity of the regions corresponding to the line 903b and the line 904b is stronger than the ideal intensity. By having strong/weak repeating regions corresponding to the line 902b to the line 905b, moire in the direction orthogonal to the vector V1 in FIG. 9B is also visually perceived. Note that though not illustrated, with the halftone processing #2 illustrated in FIG. 8B also, moire in the direction orthogonal to the vector V3 caused by a periodic deviation in the scan positions of the scan lines is visually perceived.

Next, shift processing for reducing the occurrences of the moire described using FIGS. 9A and 9B will be described using FIGS. 10A and 10B. FIG. 10A illustrates shift processing for reducing the moire caused by a shift in the scan lines to the positive side of the sub-scan direction as illustrated in FIG. 7A. FIG. 10B illustrates shift processing for reducing the moire caused by a shift in the scan lines to the negative side of the sub-scan direction as illustrated in FIG. 7B. Note that as in FIGS. 7A and 7B, in FIGS. 10A and 10B, the scan lines from the four scanning beams 81-1 to 81-4 are denoted as scan lines #1 to #4.

In FIG. 10A, the scan lines #2 to #4 are each shifted to the negative side of the main scan direction. The scan line #1 is not shifted, and thus the scanning start position and the scan end position of the scan line #1 both matched the target start position and the target end position. The scan line #2, the scan line #3, and the scan line #4 are each shifted to the negative side of the main scan direction by A, B, and C, respectively. In other words, the scanning start position and the scan end position of the scan lines #2 to #4 are each shifted to the negative side of the main scan direction by A, B, and C, respectively, relative to the target start position and the target end position. In FIG. 10B, the scan lines #2 to #4 are each shifted to the positive side of the main scan direction by A, B, and C, respectively. Note that the absolute value of a shift amount A is set to ⅓ of the absolute value of a shift amount C, and the absolute value of a shift amount B is set to ⅔ of the absolute value of the shift amount C.

As with FIG. 9A, FIG. 11A illustrates an image formed when the scan lines are shifted to the positive side of the sub-scan direction. However, in FIG. 11A, the shift processing to shift to the negative side illustrated in FIG. 10A is applied. Line 1102a to line 1105a of FIG. 11A correspond to the line 902a to the line 905a of FIG. 9A.

Regarding the first dot regions formed of the scan lines #1, #2, and #3, the most downstream scan line #3 is shifted to the negative side of the main scan direction by B=2C/3 relative to the most upstream scan line #1. Regarding the fourth dot regions formed of the scan lines #2, #3, and #4, the most downstream scan line #4 is shifted to the negative side of the main scan direction by (C−A)=2C/3 relative to the most upstream scan line #2. Regarding the second dot regions formed of the scan lines #4, #1, and #2, the most downstream scan line #2 is shifted to the positive side of the main scan direction by (C−A)=2C/3 relative to the most upstream scan line #4. Regarding the third dot regions formed of the scan lines #3, #4, and #1, the most downstream scan line #1 is shifted to the positive side of the main scan direction by B=2C/3 relative to the most upstream scan line #3.

Figure 12D:
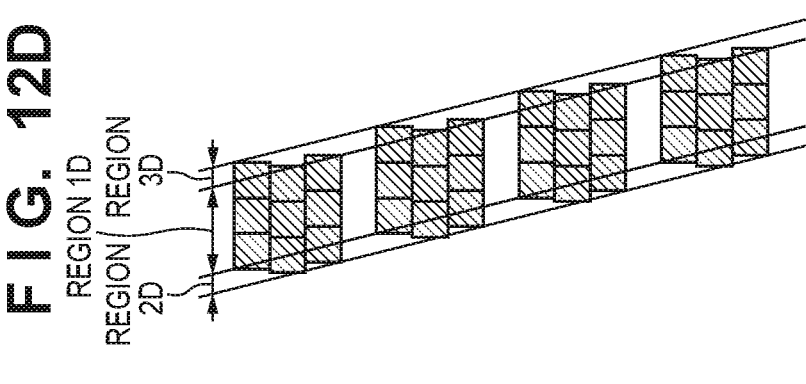
Figure 12C:
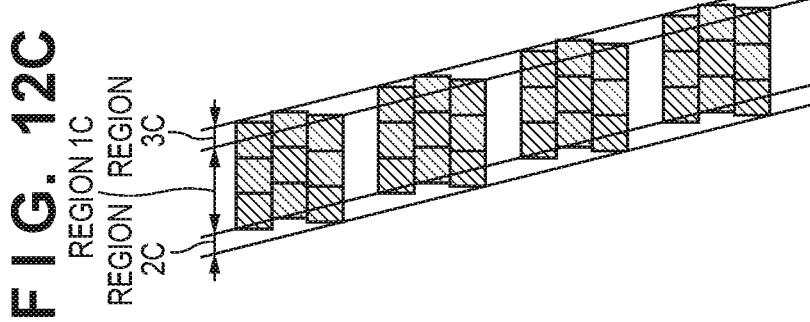
Figure 12B:
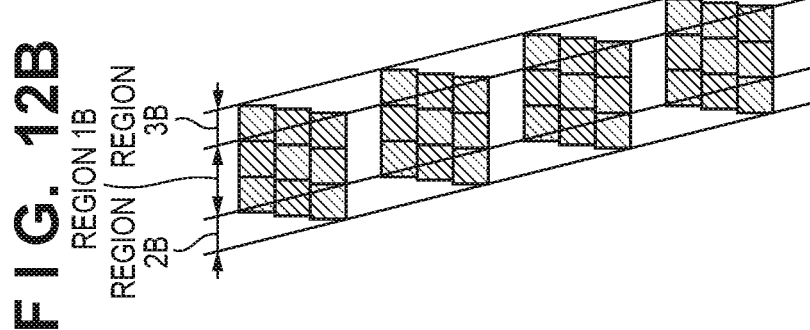
Figure 12A:
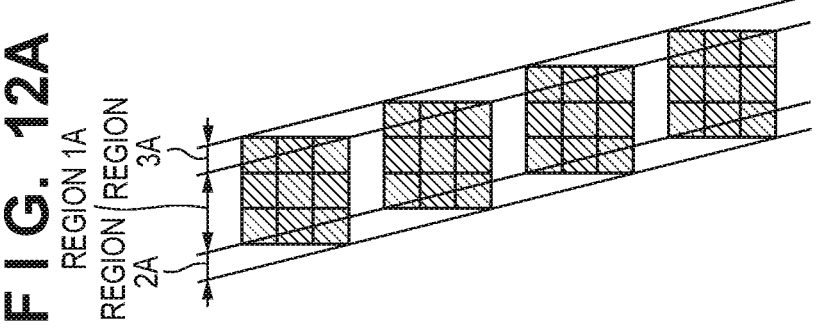

The reason that shift processing can reduce moire is described below. FIG. 12A illustrates each dot region in the image illustrated in FIG. 8A in a case where the scan lines are formed without deviation in their position. Also, FIG. 12B illustrates the first dot regions and the fourth dot regions of FIG. 11A. FIG. 12C illustrates the second dot regions of FIG. 11A, and FIG. 12D illustrates the third dot regions of FIG. 11A. The four straight lines in FIGS. 12A to 12D are each straight lines joining the same four corners of each dot region. Region 1A to region 1D are regions between the two inner straight lines from among the four straight lines. Regions 2A to 2D are regions between the straight line on the left end in the diagram and the straight line second from the left, and regions 3A to 3D are regions between the straight line on the right end in the diagram and the straight line second from the right. In the region 1A to region 1D, the percentage of the toner-adhered area is relatively high, but in the regions 2A to 2D and the regions 3A to 3D, the percentage of the toner-adhered area is relatively low. In other words, the density of the regions 1A to 1D is higher than the density of the regions 2A to 2D and the regions 3A to 3D.

As illustrated in FIG. 12B, the first dot regions and the fourth dot regions of FIG. 11A form a parallelogram-like shape with the most downstream scan line being shifted to the negative side of the main scan direction relative to the most upstream scan line. Thus, the length in the main scan direction of the region 1B is less than the length in the main scan direction of the region 1A. Since the area of the high-density region 1B is smaller than the area of the region 1A, the intensity of the region corresponding to the lines 1102a and 1105a of FIG. 11A is weaker than the intensity of the region corresponding to the line 902a and the line 905a of FIG. 9A. As illustrated in FIGS. 12C and 12D, regarding the second dot regions and the third dot regions of FIG. 11A, the most downstream scan lines are shifted to the positive side of the main scan direction relative to the most upstream scan lines. Thus, the length in the main scan direction of the regions 1C and 1D is greater than the length in the main scan direction of the region 1A. Since the area of the high-density regions 1C and 1D is larger than the area of the region 1A, the intensity of the region corresponding to the lines 1103a and 1104a of FIG. 11A is stronger than the intensity of the region corresponding to the line 903a and the line 904a of FIG. 9A.

In a similar manner, since the scan lines are shifted to the negative side of the main scan direction, compared to when the scan lines are not shifted, the intensity of the linear region joining the first dot regions and the fourth dot regions is weaker and the intensity of the linear region joining the second dot regions and the third dot regions is stronger. Thus, as illustrated in FIG. 9A, moire caused by the scan positions of the scan lines being periodically and linearly shifted to the positive side of the sub-scan direction along the sub-scan direction can be reduced, and moire can be made less visually perceivable.

In other words, the first dot regions and the fourth dot regions are both dot regions formed in one period of a periodic shift in the scan positions in the sub-scan direction. In a case where the scan positions are shifted to the positive side in the sub-scan direction, the area of the first dot regions and the fourth dot regions is increased. In this case, shift processing is performed so that the shape of the first dot regions and the fourth dot regions becomes a parallelogram-like shape (FIG. 12B) with sides inclined to the opposite side to the direction of the vector V1, namely the direction orthogonal to the moire direction, relative to the sub-scan direction. In other words, the most downstream scan lines are shifted to the opposite side to the vector V1 in the main scan direction relative to the most upstream scan lines forming the first dot regions and the fourth dot regions. This allows moire to be reduced and moire to be made less visually perceivable.

Also, the second dot regions and the third dot regions are both dot regions formed across periods of a periodic shift in the scan positions in the sub-scan direction. In a case where the scan positions are shifted to the positive side in the sub-scan direction, the area of the second dot regions and the third dot regions is decreased. In this case, the most downstream scan lines are shifted to the same side as the vector V1 in the main scan direction relative to the most upstream scan lines forming the second dot regions and the third dot regions (FIGS. 12C and 12D). This allows moire to be reduced and moire to be made less visually perceivable.

As with FIG. 9B, FIG. 11B illustrates an image formed when the scan lines are shifted to the negative side of the sub-scan direction. However, in FIG. 11B, the shift processing to shift to the positive side illustrated in FIG. 10B is applied. Line 1102*b* to line 1105*b* of FIG. 11B correspond to the line 902*b* to the line 905*b* of FIG. 9B. In each dot region of FIG. 11B, the shift direction of the most downstream scan lines relative to the most upstream scan lines is the opposite of that in FIG. 11A.

FIG. 12E illustrates the first dot regions and the fourth dot regions of FIG. 11B. FIG. 12F illustrates the second dot regions of FIG. 11B, and FIG. 12G illustrates the third dot regions of FIG. 11B. The four straight lines in FIGS. 12E to 12G are each straight lines joining the same four corners of each dot region. Region 1E to region 1G are regions between the two inner straight lines from among the four straight lines. Regions 2E to 2G are regions between the straight line on the left end in the diagram and the straight line second from the left, and regions 3E to 3G are regions between the straight line on the right end in the diagram and the straight line second from the right. The density of the regions 1E to 1G is higher than the density of the regions 2E to 2G and the regions 3E to 3G.

Regarding the first dot regions and the fourth dot regions of FIG. 11B, the most downstream scan lines are shifted to the positive side of the main scan direction relative to the most upstream scan lines. Thus, the length in the main scan direction of the region 1E is greater than the length in the main scan direction of the region 1A. Since the area of the high-density region 1E is larger than the area of the region 1A, the intensity of the region corresponding to the lines 1102*b* and 1105*b* of FIG. 11B is stronger than the intensity of the region corresponding to the line 902*a* and the line 905*a* of FIG. 9B. Regarding the second dot regions and the third dot regions of FIG. 11B, the most downstream scan lines are shifted to the negative side of the main scan direction relative to the most upstream scan lines. Thus, the length in the main scan direction of the regions 1F and 1G is less than the length in the main scan direction of the region 1A. Since the area of the high-density regions 1F and 1G is smaller than the area of the region 1A, the intensity of the region corresponding to the lines 1103*b* and 1104*b* of FIG. 11B is weaker than the intensity of the region corresponding to the line 903*b* and the line 904*b* of FIG. 9B.

In a similar manner, since the scan lines are shifted to the positive side of the main scan direction, compared to when the scan lines are not shifted, the intensity of the linear region joining the first dot regions and the fourth dot regions is stronger and the intensity of the linear region joining the second dot regions and the third dot regions is weaker. Thus, as illustrated in FIG. 9B, moire caused by the scan positions of the scan lines being periodically and linearly shifted to the negative side of the sub-scan direction along the sub-scan direction can be reduced, and moire can be made less visually perceivable.

In other words, the first dot regions and the fourth dot regions are both dot regions formed in one period of a periodic shift in the scan positions in the sub-scan direction. In a case where the scan positions are shifted to the negative side in the sub-scan direction, the area of the first dot regions and the fourth dot regions is decreased. In this case, shift processing is performed so that the shape of the first dot regions and the fourth dot regions becomes a parallelogram-like shape (FIG. 12E) with sides inclined to the same side as the direction of the vector V1, namely the direction orthogonal to the moire direction, relative to the sub-scan direction. In other words, the most downstream scan lines are shifted to the same side as the vector V1 in the main scan direction relative to the most upstream scan lines forming the first dot regions and the fourth dot regions. This allows moire to be reduced and moire to be made less visually perceivable.

Also, the second dot regions and the third dot regions are both dot regions formed across periods of a periodic shift in the scan positions in the sub-scan direction. In a case where the scan positions are shifted to the negative side in the sub-scan direction, the area of the second dot regions and the third dot regions is increased. In this case, the most downstream scan lines are shifted to the opposite side to the vector V1 in the main scan direction relative to the most upstream scan lines forming the second dot regions and the third dot regions (FIGS. 12F and 12G). This allows moire to be reduced and moire to be made less visually perceivable.

In the present embodiment, the shift amount of each scan line is included in the correction information as "start position information". The start position information includes the shift direction, namely information indicating whether to shift to the positive side or the negative side of the main scan direction, and information indicating the absolute value of the shift amount. For example, the start position information is information indicating the shift amount with a sign attached. Note that as described above, B=2C/3 and A=C/3. Thus, the start position information can be indicated via a value for C, the maximum shift amount, with a sign attached. In this case, the shift amount of other scan lines are determined on the basis of the value for C.

As described above, in the case of "halftone processing #1" illustrated in FIG. 8A, when the shift direction in the sub-scan direction of the scan positions of the scan lines is the positive side, the shift direction in the shift processing corresponds to the negative side in the main scan direction. Also, in the "halftone processing #1", when the shift direction in the sub-scan direction of the scan positions of the scan lines is the negative side, the shift direction in the shift processing corresponds to the positive side in the main scan direction. In the case of the "halftone processing #2" illustrated in FIG. 8B, the first vector (vector V3) is inclined to the opposite side relative to the sub-scan direction compared to the first vector (vector V1) of the "halftone processing #1". Thus, the direction of the shift processing is also the opposite of that for the "halftone processing #1". In other words, in the case of "halftone processing #2" illustrated in FIG. 8B, when the shift direction in the sub-scan direction of the scan positions of the scan lines is the positive side, the shift direction in the shift processing corresponds to the positive side in the main scan direction. Also, in the "halftone processing #2", when the shift direction in the sub-scan direction of the scan positions of the scan lines is the negative side, the shift direction in the shift processing corresponds to the negative side in the main scan direction. This is illustrated in FIG. 13. Note that the "shift direction (main scan direction) in which moire is less visually perceivable" at the bottom of FIG. 13 will be described in the second embodiment.

Note that the absolute value of the shift amount in the shift processing, namely the absolute value of the value C in FIGS. 10A and 10B is set on the basis of the absolute value of the shift amount in the sub-scan direction, namely the absolute value of the value I of FIG. 7A and the absolute value of the value L of FIG. 7B, for example.

In the embodiment described above, a periodic shift in the scan positions in the sub-scan direction of the scan lines appears as a period of four scan lines. However, the present embodiment is not limited to a periodic shift in the scan positions in the sub-scan direction of the scan lines appearing as a period of four scan lines. In other words, the present embodiment may be similarly applied in a case where a linear shift to the sub-scan direction in the scan positions appears with a period of N number (N being an integer or 2 or more) of scan lines. For example, the scan positions of N scan lines may be linearly shifted to the positive side or the negative side of the sub-scan direction relative to the target positions along the sub-scan direction, and thus the absolute values of the shift amounts relative to the target positions of the scan positions of the N scan lines may be increased along the sub-scan direction. This may be caused when scanning the photosensitive body 122 using N scanning beams, for example. Also, a shift in the scan positions may be caused by a manufacturing error in each reflective surface of the rotating polygonal member 200. Thus, a linear shift in the scan positions with a period of N scan lines may be caused when scanning the photosensitive body 122 with less than N scanning beams, for example, when scanning the photosensitive body 122 with one scanning beam.

In the case of using the halftone processing #1 and the scan positions of the N scan lines being shifted to the positive side of the sub-scan direction, the start position information indicates to linearly shift the start positions of the N scan lines to the negative side of the main scan direction along the sub-scan direction. Also, in the case of using the halftone processing #1 and the scan positions of the N scan lines being shifted to the negative side of the sub-scan direction, the start position information indicates to linearly shift the start positions of the N scan lines to the positive side of the main scan direction along the sub-scan direction. Furthermore, in the case of using the halftone processing #2 and the scan positions of the N scan lines being shifted to the positive side of the sub-scan direction, the start position information indicates to linearly shift the start positions of the N scan lines to the positive side of the main scan direction along the sub-scan direction. In the case of using the halftone processing #2 and the scan positions of the N scan lines being shifted to the negative side of the sub-scan direction, the start position information indicates to linearly shift the start positions of the N scan lines to the negative side of the main scan direction along the sub-scan direction.

Accordingly, the shape of the first dot regions and the fourth dot regions formed by only the N scan lines in one period of a linear shift of a plurality of scan lines is a parallelogram-like shape. Note that in the case of increasing the area of the first dot regions and the fourth dot regions to more than that when there is no linear shift of the scan lines, the parallelogram-like shape includes sides inclined to the opposite side relative to the sub-scan direction to the first vector of the halftone processing. On the other hand, in the case of decreasing the area of the first dot regions and the fourth dot regions to more than that when there is not linear shift in the scan lines, the parallelogram-like shape includes sides inclined to the same side relative to the sub-scan direction as the first vector of the halftone processing. Thus, the high/low density caused by a linear shift in the scan lines can be made less visually perceivable, which in turn can reduce moire.

Here, the halftone processing #1 is the halftone processing described using FIG. 8A, and the halftone processing #2 is the halftone processing described using FIG. 8B. Note that the halftone processing #1 may be defined as halftone processing in which a first direction orthogonal to the direction of moire caused by a linear shift in the positions in the sub-scan direction of the scan lines with a period of N scan lines is shifted to the positive side of the main scan direction along the sub-scan direction. In a similar manner, the halftone processing #2 may be defined as halftone processing in which the first direction is shifted to the negative side of the main scan direction along the sub-scan direction.

Note that a linear and periodic shift to the positive side of the sub-scan direction in the scan positions in the sub-scan direction of the scan lines as illustrated in FIG. 7A is caused in a case where the interval between the N scan lines is greater than the reference interval E2. Thus, in a case where there is displacement to the positive side as illustrated in FIG. 7A, the shift is such that the interval between the plurality of scan lines is a first interval for the consecutive N−1 scan lines and the interval is a second interval less than the first interval for the remaining one scan line. In a similar manner, in a case where there is displacement to the negative side as illustrated in FIG. 7B, the shift is such that the interval between the plurality of scan lines is a first interval for the consecutive N−1 scan lines and the interval is a second interval greater than the first interval for the remaining one scan line. Accordingly, in a case where the interval between the plurality of scan lines is changed as described above, the scanning start positions of the N scan lines forming the (N−1) number of intervals are linearly shifted in the main scan direction along the sub-scan direction, allowing moire to be reduced.

Second Embodiment

Next, a second embodiment will be described, focusing on the points that differ from the first embodiment. In the first embodiment, moire caused by deviation in the positions of scan lines in the sub-scan direction is reduced by shifting the scan lines in the main scan direction. Thus, for example, if shift processing of the scan lines is performed when there is no deviation in the positions of the scan lines in the sub-scan direction, the shift processing of the scan lines may cause moire.

Figure 14:
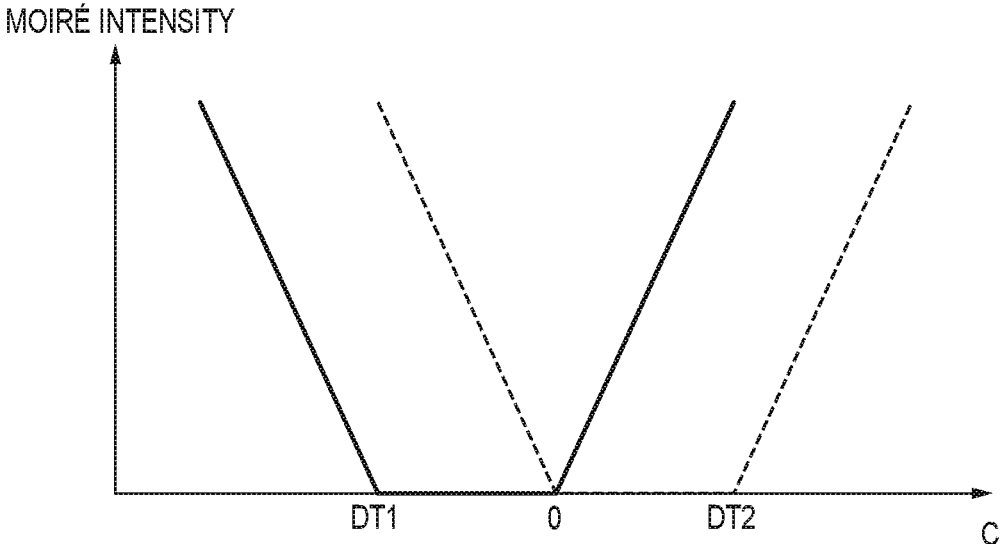
FIG. 14 is a diagram illustrating the relationship between shift processing and moire intensity.

FIG. 14 illustrates the relationship between shift processing in a case where there is no shift in the positions of the scan lines in the sub-scan direction and moire intensity. Note that the solid line in FIG. 14 represents the halftone processing #1 (FIG. 8A), and the broken line represents the halftone processing #2 (FIG. 8B). The horizontal axis of FIG. 14 represents the shift amount C (with a sign) of FIGS. 10A and 10B. As illustrated in FIG. 14, in the case of the halftone processing #1, moire is less visually perceivable even when shift processing is performed with the value for C in the range DT1-0, but moire is more visually perceivable when the value for C is outside of the range DT1-0. Note that DT1 is a negative value. On the other hand, in the case of the halftone processing #2, moire is less visually perceivable even when shift processing is performed with the value for C in the range 0-DT2, but moire is more visually perceivable when the value for C is outside of the range 0-DT2. Note that DT2 is a positive value.

From FIG. 14, it can be seen that, in the case of the halftone processing #1, performing the negative side shift processing is better than performing the positive side shift processing. Conversely, it can be seen that, in the case of the halftone processing #2, performing the positive side shift processing is better than performing the negative side shift processing. The "shift direction (main scan direction) in which moire is less visually perceivable" of FIG. 13 has been described in terms of the type of halftone processing using FIG. 14 and indicates the direction of shift processing in which moire is less visually perceivable.

The direction of shift processing for suppressing moire caused by a shift in the positions in the sub-scan direction of the scan lines has been described using FIG. 14 and preferably matches the direction of shift processing in which moire is less visually perceivable. For example, in the case of the halftone processing #1, when the shift direction in the sub-scan direction of the scan lines is the positive side, the direction of the shift processing for suppressing moire caused by this shift is the negative side and matches the direction of shift processing in which moire is less visually perceivable. In the case of the halftone processing #2, when the shift direction in the sub-scan direction of the scan lines is the positive side, the direction of the shift processing for suppressing moire caused by this shift is the positive side and matches the direction of shift processing in which moire is less visually perceivable. Thus, in both the halftone processing #1 and the halftone processing #2, a shift to the sub-scan direction of the scan lines is preferably to the positive side rather than the negative side.

Thus, in the present embodiment, a target value E2' for adjusting the interval of the four scanning beams 81-1 to 81-4 of the photosensitive body 122 is set to a value greater than the reference interval E2 (see FIG. 6B), which is the ideal value. In the case of using the halftone processing #1, the target value E2' is, for example, set so that it can be canceled out by performing shift processing to the negative side with the absolute value for C set to DT1/2. Also, in the case of using the halftone processing #2, the target value E2' is, for example, set so that it can be canceled out by performing shift processing to the positive side with the absolute value for C set to DT2/2. Then, the start position information of the correction information is decided and set on the basis of the actual measurement values. In the case of using the halftone processing #1, the start position information may indicate performing shift processing of the negative side with the absolute value for C set to DT1/2+a, and in the case of using the halftone processing #2, the start position information may indicate performing shift processing of the positive side with the absolute value for C set to DT2/2+β. Here, α and β are values corresponding to the deviation from the target value E2'.

By arranging the light sources and setting the start position information as described above, moire from deviation in the scan lines in the main scan direction and the sub-scan direction can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-060833, filed Apr. 4, 2023, which is hereby incorporated by reference herein in its entirety.

What is claimed is:

1. An image forming apparatus, comprising:
a photosensitive body;
a scanning unit configured to form an electrostatic latent image using a plurality of scan lines on the photosensitive body by, on a basis of an image signal, performing scanning of the photosensitive body in a main scan direction using one or more scanning beams repeatedly in a sub-scan direction orthogonal to the main scan direction;
a generating unit configured to perform halftone processing on image data and generate the image signal; and
a storing unit configured to store start position information indicating start positions in the main scan direction of the plurality of scan lines,
wherein, in a case where scan positions in the sub-scan direction of the plurality of scan lines are linearly shifted relative to a target position with a period of N (N being an integer of 2 or more) scan lines, the start position information indicates to linearly shift the start positions of N scan lines in the main scan direction along the sub-scan direction.

2. The image forming apparatus according to claim 1, wherein
the scanning unit includes a light source that generates N scanning beams, and
a shift with a period of the N scan lines is caused by a difference between an interval in the sub-scan direction of the N scanning beams at the photosensitive body and a reference interval.

3. The image forming apparatus according to claim 2, wherein
the scanning unit is arranged such that the interval in the sub-scan direction of the N scanning beams at the photosensitive body is greater than the reference interval.

4. The image forming apparatus according to claim 1, wherein
the start position information indicates to linearly shift the start positions of the N scan lines to a positive side or a negative side of the main scan direction along the sub-scan direction depending on whether a linear shift with a period of the N scan lines is a shift to a positive side or a negative side of the sub-scan direction relative to the target position and a type of the halftone processing.

5. The image forming apparatus according to claim 4, wherein the type of the halftone processing includes:

the halftone processing of a first type in which a first direction orthogonal to a direction of moire caused by a linear shift with a period of the N scan lines is shifted to a positive side of the main scan direction along the sub-scan direction, and the halftone processing of a second type in which the first direction is shifted to a negative side of the main scan direction along the sub-scan direction.

6. The image forming apparatus according to claim 4, wherein the type of the halftone processing includes:

the halftone processing of a first type in which a direction of a first vector which forms a smaller angle with the sub-scan direction of two vectors of the halftone processing is shifted to a positive side of the main scan direction along the sub-scan direction, and the halftone processing of a second type in which the direction of the first vector is shifted to a negative side of the main scan direction along the sub-scan direction.

7. The image forming apparatus according to claim 5, wherein in a case of the generating unit using the halftone processing of the first type and the scan positions of the N scan lines being shifted to a positive side of the sub-scan direction, the start position information indicates to linearly shift the start positions of the N scan lines to a negative side of the main scan direction along the sub-scan direction.

8. The image forming apparatus according to claim 5, wherein in a case of the generating unit using the halftone processing of the first type and the scan positions of the N scan lines being shifted to a negative side of the sub-scan direction, the start position information indicates to linearly shift the start positions of the N scan lines to a positive side of the main scan direction along the sub-scan direction.

9. The image forming apparatus according to claim 5, wherein in a case of the generating unit using the halftone processing of the second type and the scan positions of the N scan lines being shifted to a positive side of the sub-scan direction, the start position information indicates to linearly shift the start positions of the N scan lines to a positive side of the main scan direction along the sub-scan direction.

10. The image forming apparatus according to claim 5, wherein in a case of the generating unit using the halftone processing of the second type and the scan positions of the N scan lines being shifted to a negative side of the sub-scan direction, the start position information indicates to linearly shift the start positions of the N scan lines to a negative side of the main scan direction along the sub-scan direction.

11. The image forming apparatus according to claim 1, wherein in a case where an area of a first halftone dot of the halftone processing formed by only the N scan lines in one period of a linear shift of the plurality of scan lines is increased to more than when there is no linear shift of the plurality of scan lines, due to a shift in the start positions of the N scan lines indicated by the start position information, a shape of the first halftone dot is a parallelogram-like shape with a side inclined to an opposite side relative to the sub-scan direction to a first direction orthogonal to a direction of moire caused by a linear shift with a period of the N scan lines.

12. The image forming apparatus according to claim 1, wherein in a case where an area of a first halftone dot of the halftone processing formed by only the N scan lines in one period of a linear shift of the plurality of scan lines is decreased to less than when there is no linear shift of the plurality of scan lines, due to a shift in the start positions of the N scan lines indicated by the start position information, a shape of the first halftone dot is a parallelogram-like shape with a side inclined to an identical side relative to the sub-scan direction as a first direction orthogonal to a direction of moire caused by a linear shift with a period of the N scan lines.

13. An image forming apparatus, comprising:

a photosensitive body;

a scanning unit configured to form an electrostatic latent image using a plurality of scan lines on the photosensitive body by, on a basis of an image signal, performing scanning of the photosensitive body in a main scan direction using one or more scanning beams repeatedly in a sub-scan direction orthogonal to the main scan direction;

a generating unit configured to perform halftone processing on image data and generate the image signal; and a storing unit configured to store start position information indicating start positions in the main scan direction of the plurality of scan lines, wherein, in a case where an interval between the plurality of scan lines formed by the scanning unit is shifted such that, with a period of N consecutive intervals along the sub-scan direction, (N−1) consecutive intervals from among the N intervals is a first interval and a remaining one interval is a second interval different from the first interval, the start position information indicates to linearly shift the start positions of N scan lines forming the (N−1) intervals in the main scan direction along the sub-scan direction.

* * * * *